July 20, 1948. B. G. CARLSON 2,445,388
VERTICAL HYDRAULIC GYROS
Filed Feb. 17, 1945
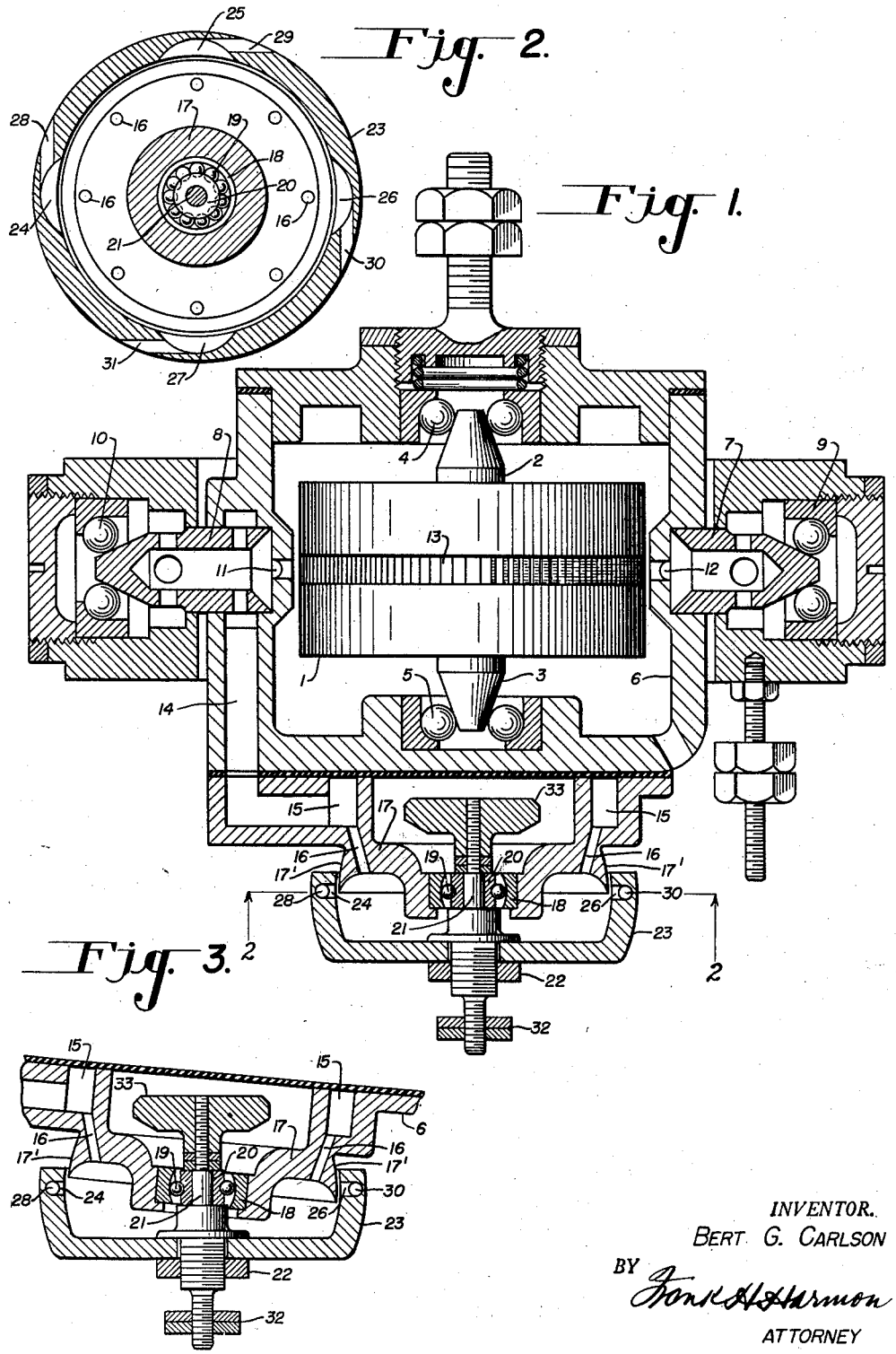
INVENTOR.
BERT G. CARLSON
BY
ATTORNEY Patented July 20, 1948

2,445,388

UNITED STATES PATENT OFFICE 2,445,388

VERTICAL HYDRAULIC GYRO

Bert G. Carlson, Gates Mills, Ohio, assignor, by mesne assignments, to Jack & Heintz Precision Industries, Inc., Cleveland, Ohio, a corporation of Delaware Application February 17, 1945, Serial No. 578,525

6 Claims. (Cl. 74—5)

This invention in general relates to gyro assemblies and has for one of its primary objects to provide for an hydraulically driven horizon gyro having a vertical rotor spin axis and an improved fluid gravity pull erection device.

To this end it is proposed to suspend from the bottom of the inner gimbal a cup-shaped wheel rotatable in spherical bearings normally about an axis coincident with that of the gyro rotor. Ports are provided to permit the flow of pressure oil into the wheel and tangentially extending ports are provided for its escape. Precessing of the gyro causes the fluid gravity pull erection device to become pivoted relative to its spherical bearing and this causes the outlet ports on the high side to more fully open while those on the low side become more restricted to fluid flow therethrough. The unbalance of jet velocity of oil outward through the tangential passages provides the required erecting force.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in vertical section taken through an horizon gyro assembly and the erection wheel, the gyro rotor being shown in elevation;

Figure 2 is a view in section taken along line 2—2 of Figure 1 showing the inlet and outlet ports for the erection wheel; and Figure 3 is a fragmentary view in vertical section showing the relationship between the gyro and the erecting wheel as the gyro becomes tilted with respect to the vertical.

Referring more particularly to the drawings, the gyro rotor 1 has its vertical pivots 2 and 3 mounted in bearing assemblies 4 and 5 in a gimbal 6 for counterclockwise rotation of the rotor, as viewed in Figure 2. This gimbal frame carries hollow trunnions 7 and 8 supported by bearing assemblies 9 and 10. Oil under pressure is introduced into hollow trunnions 7 and 8 and through passages 11 and 12 to impinge on the rotor buckets 13 to spin the rotor.

The gimbal casting is hollowed to provide a passage 14 to carry pressure oil from the hollow trunnion 7 to an annular passage 15 and thence through a series of spaced restricted passages 16 in the lower partition 17 of the gimbal frame below the lower bearing 5. This partition is centrally apertured to receive a spherical bearing race 18. This bearing race 18 receives the ball bearings 19 carried by an inner race 20 for rotatably carrying a spindle 21 to which is adjustably and removably connected by a nut 22 a cup-shaped wheel 23. This wheel 23 has a spherical inner upper surface to correspond to the spherical outer surface 17' of the partition 17 which it overlaps and to which it is adjacent.

The wheel 23 has its inner wall dished out to provide ports at 24, 25, 26 and 27 from which extend tangential passages 28, 29, 30 and 31, respectively, to the exterior. The spindle is screw threaded to receive adjustable weight nuts 32 and an adjustable counterweight 33. With oil under pressure flowing into wheel 23 the effect of the tangentially extending passages 28—31 as the oil flows out of them is to impart a rotary motion to the wheel in the same clockwise direction as the gyro rotor 1 as the supporting spindle rotates in its bearing assembly.

As long as the gyro assembly is erect and the axis of the gyro wheel is truly vertical, as shown in Figure 1, the passages 24—27 and consequently the tangential passages 28—31 are maintained equally opened by their uniform relationship with the outer spherical surface of the adjacent partition 17. When, however, the gyro becomes inclined in a manner, such as shown in Figure 3, the liquid filled rotating wheel maintains its vertical attitude. This is permitted by the loose shiftable engagement of ball bearings 19 with the outer race 18 whose inner surface is spherical and of a relatively large arc of curvature. As this occurs the right side of gimbal 6 is lowered as the left side is elevated and this brings the right side of the lower spherical surface 17' into position to close the ports 24, 25, 26 and 27 of wheel 23 and the left side of surface 17' to fully open the same. Figure 3 shows outlet port 26, 30 closed and outlet port 44, 28 fully opened. It is to be understood, however, that the wheel 23 continues to rotate when the gyro is tilted, as well as when the gyro is vertical, so that when the gyro is tilted the low side of surface 17' restricts the flow of liquid through the wheel outlet ports and the high side opens them wider to liquid flow as the wheel rotates. This creates a torque which overcomes the gravity action of the weight of the liquid and effects an erection of the gyro. Upon restoration of normal conditions the gyro resumes its vertical position and the gravity responsive wheel returns to its normal central spinning relationship with the gyro assembly as shown in Figure 1.

I claim:

1. An erecting device for gyro verticals comprising a universally supported rotor bearing frame and a fluid driven gyro rotor therein, a wheel rotatably and pendulously mounted on said frame and in communication with the pressure fluid for driving said rotor, said wheel having a plurality of circumferentially spaced outlet passages extending tangentially through its outer rim to impel rotation to said wheel in the same direction as that of said gyro rotor and normally about an axis coincidental with that of said gyro as pressure fluid is discharged through said passages and valve means carried by said frame for maintaining said outlet passages equally open while said gyro remains vertical and when said gyro is tilted adapted to restrict fluid flow through said passages as they pass by the low side of said gyro and more fully open fluid flow through said passages as they pass by the high side of the tilted gyro and its valve means for creating a torque to erect said gyro.

2. An erecting device for gyro verticals comprising a universally supported rotor bearing frame and a fluid driven gyro rotor therein, a wheel rotatably and pendulously mounted in spherical bearings on said frame and in communication with the pressure fluid for driving said rotor, said wheel having a plurality of circumferentially spaced outlet passages extending tangentially through its outer rim to impel rotatation to said wheel in the same direction as that of said gyro rotor and normally about an axis coincidental with that of said gyro as pressure fluid is discharged through said passages and valve means rigid with the frame for maintaining said outlet passages equally open while said gyro remains vertical and when said gyro is tilted adapted to restrict fluid flow through said passages as they pass by the low side of said gyro and more fully open fluid flow through said passages as they pass by the high side of the tilted gyro and its valve means for creating a torque to erect said gyro.

3. An erecting device for gyro verticals comprising a universally supported rotor bearing frame and a fluid driven gyro rotor therein, a wheel rotatably and pendulously mounted having a spherical inner surface and having a plurality of circumferentially spaced outlet passages extending tangentially through its outer rim to impel rotation to said wheel in the same direction as that of said gyro rotor and normally about an axis coincidental with that of said gyro as pressure fluid is discharged through said passages and valve means including a spherical member adjacent the inner surface of said wheel and rigid and coextensive with the frame for maintaining said outlet passages equally open while said gyro remains vertical and when said gyro is tilted adapted to close said passages as they pass by the low side of said gyro and more fully open fluid flow through said passages as they pass by the high side of the tilted gyro and its valve means for creating a torque to erect said gyro.

4. An erecting device for gyro verticals comprising a universally supported rotor bearing frame and an hydraulically driven gyro rotor therein, a wheel rotatably and pendulously mounted in spherical bearings on said frame and in communication with the pressure liquid for driving said rotor, said wheel having a spherical inner surface and having a plurality of circumferentially spaced outlet passages extending tangentially through its outer rim to impel rotation to said wheel in the same direction as that of said gyro rotor and normally about an axis coincidental with that of said gyro as pressure liquid is discharged through said passages and valve means including a spherical member adjacent the inner surface of said wheel and rigid and coextensive with the frame for maintaining said outlet passages equally open while said gyro remains vertical and when said gyro is tilted adapted to restrict fluid flow through said passages as they pass by the low side of said gyro and more fully open fluid flow through said passages as they pass by the high side of the tilted gyro and its valve means for creating a torque to erect said gyro.

5. An erecting device for gyro verticals comprising a universally supported rotor bearing frame and a fluid driven gyro rotor therein, a wheel rotatably and pendulously mounted on said frame and in communication with the pressure fluid for driving said rotor, said wheel having a plurality of circumferentially spaced outlet passages extending tangentially through its outer rim to impel rotation to said wheel in the same direction as that of said gyro rotor and normally about an axis coincidental with that of said gyro as pressure fluid is discharged through said passages and valve means for said wheel exhaust passages actuated in accordance with the tilting of said gyro to create a torque to cause said wheel to exert an erecting force on said gyro.

6. An erecting device for gyro verticals comprising a universally supported rotor bearing frame and an hydraulically driven gyro rotor therein, a wheel rotatably and pendulously mounted in spherical bearings on said frame and in communication with the pressure liquid for driving said rotor, said wheel having a plurality of circumferentially spaced outlet passages extending tangentially through its outer rim to impel rotation to said wheel in the same direction as that of said gyro rotor and normally about an axis coincidental with that of said gyro as pressure liquid is discharged through said passages and valve means rigid with said frame and actuated in accordance with the tilt of said gyro to open and restrict fluid flow through said wheel outlet passages to create a torque as said wheel rotates to cause said wheel to exert an erecting force on said gyro.

BERT G. CARLSON.

REFERENCES CITED

The following references are of record in the file of this patent:

UNITED STATES PATENTS

| Number | Name | Date |
| --- | --- | --- |
| 2,219,243 | Kollsman | Oct. 22, 1940 |
| 2,292,989 | Carter | Aug. 11, 1942 |
| 2,380,941 | Carter | Aug. 7, 1945 |